United States Patent
B R et al.

(10) Patent No.: US 11,928,481 B2
(45) Date of Patent: Mar. 12, 2024

(54) METHOD AND SYSTEM FOR DETERMINING OPTIMAL COMPUTING CONFIGURATION FOR EXECUTING COMPUTING OPERATION

(71) Applicant: Siemens Aktiengesellschaft, Munich (DE)

(72) Inventors: Chethan Ravi B R, Karnataka (IN); Vidyabhushana Hande, Karnataka (IN); Vinay Ramanath, Karnataka (IN); Ankit Vijaysing Ghoti, Maharashtra (IN)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 17/895,921

(22) Filed: Aug. 25, 2022

(65) Prior Publication Data

US 2023/0061681 A1    Mar. 2, 2023

(30) Foreign Application Priority Data

Aug. 31, 2021   (EP) ..................... 21193919

(51) Int. Cl.
  *G06F 9/445* (2018.01)
  *G06N 5/022* (2023.01)
(52) U.S. Cl.
  CPC ......... *G06F 9/44505* (2013.01); *G06N 5/022* (2013.01)
(58) Field of Classification Search
  CPC .............. G06F 9/44505; G06N 5/022
  See application file for complete search history.

(56) References Cited

U.S. PATENT DOCUMENTS 9,519,522 B1  12/2016  Phadke
2015/0271023 A1*  9/2015  Anderson ............. H04L 41/145
                                                      709/223
(Continued)

FOREIGN PATENT DOCUMENTS

WO    2012142069 A2    10/2012
WO    2016179455 A1    11/2016
WO    2021122652 A1     6/2021

*Primary Examiner* — Tammara R Peyton
(74) *Attorney, Agent, or Firm* — Schmeiser, Olsen & Watts, LLP

(57) ABSTRACT

A system and method for determining optimal computing configuration for executing a computing operation includes defining one or more constrains of a given computing operation to be executed. The method further includes implementing a knowledge graph to determine at least one suitable combination of computing hardware and computing software based on the given computing operation and the defined one or more constrains therefor. The method further includes quantitatively estimating an energy requirement and qualitatively estimating an energy consumption pattern of the determined at least one suitable combination. The method further includes performing a life cycle assessment for execution of the given computing operation utilizing the determined at least one suitable combination of computing hardware and computing software based on the quantitative estimation of the energy requirement and the qualitative estimation of the energy consumption pattern, to determine an optimal combination of computing hardware and computing software therefor.

15 Claims, 6 Drawing Sheets

(56) References Cited

U.S. PATENT DOCUMENTS

2018/0102953 A1   4/2018   Mahindru et al.
2020/0142466 A1   5/2020   Naik et al.
2021/0263828 A1   8/2021   Gross et al.

\* cited by examiner

METHOD AND SYSTEM FOR DETERMINING OPTIMAL COMPUTING CONFIGURATION FOR EXECUTING COMPUTING OPERATION

CROSS-REFERENCE TO RELATED APPLICATIONS

This application claims priority to EP Application No. 21193919.4, having a filing date of Aug. 31, 2022, the entire contents of which are hereby incorporated by reference.

FIELD OF TECHNOLOGY

The following generally relates to optimizing computing operations, and more particularly relates to a method and a system for determining optimal combinations of computing hardware, computing software and computing parameters for performing a given computing operation.

BACKGROUND

Digitalization and automation technologies are pushing the limits of the product and process at each stages of its life cycle. Systems are becoming autonomous and intelligent with the help of advancements in Artificial Intelligence (AI) technologies. The emergence of deep learning, cloud, parallel computing architectures, and the race for sophisticated AI capabilities such as speech, image, video, and text recognition, have accelerated AI research. Meanwhile there is also advancements in hardware in terms of computing capabilities. High end computing systems are made available to most of the engineering and research communities. Different categories of AI like Machine Learning (ML), Deep Learning (DL), etc. are mainly governed by three factors namely algorithmic innovation, data, and the amount of compute available for training as represented. Algorithmic innovation and data are difficult to track, but compute is unusually quantifiable, providing an opportunity to measure one input to AI progress. The trend represents an increase by roughly a factor of 10 each year in the computing capabilities thus enabling more rigorous training on large data set.

In the early stages of AI development, it was not typical to use Graphical Processing Unit (GPU) for training ML model, and later GPUs were widely adapted for AI applications, but training was still not happening on many GPUs, mostly it was 1 to 8 GPUs rated at 1 to 2 TFLOPS for a total of 0.001-0.1 petaflop/s-day (pfs-days). Later, 10-100 GPUs rated at 5-10 TFLOPS were being used, resulting in 0.1-10 pfs-days. Herein, floating point operations per second is a measure of computer performance and TFLOPS (teraflops) refers to the capability of a processor to calculate one trillion floating-point operations per second, with a petaflop/s-day (pfs-day) consisting of performing $10^{15}$ neural net operations per second for one day, or a total of about $10^{20}$ operations. Lately, there has been significant improvement in the hardware capabilities, parallelism and development of computing chips and systems that are specifically designed and optimized for AI. Now-a-days, hardware used for AI include, in addition to CPUs and GPUs, Tensor processing unit (TPUs), Field Programmable Gate Arrays (FPGAs), Application Specific Integrated Circuits (ASICs) and the like.

While the advancements in the AI technology are appreciated, one of the crucial parameters which is missing in the mainstream consideration is sustainability of AI, mainly from the environmental perspective. There are many parameters which are considered during the development of AI process for a specific application. Further algorithms are down selected or new algorithms are devised based on these parameters. However, the environmental consideration is an aspect which has generally been neglected. Some of the early information on the impact of AI or ML on the environment is alarming. Researchers at MIT, USA found that an advance AI training emits 626,000 pounds of carbon dioxide equivalent this is nearly five times the lifetime emissions of the average American car including manufacturing of the car itself. Generally, the regulations and rules are imposed on many other products like cars, household electronic items, construction, automobiles in general etc. However, the regulations are not yet framed fully for the software aspect of the product and there exists virtually none for AI technology. Looking at the early quantifications, it is evident that the environmental considerations are necessary at the early stages of the development.

At present there some initiatives taken by various organizations to make the hardware most efficient to handle larger operation with less energy. But mostly during the development or during down-selection of the AI algorithm, an overarching environmental consideration, i.e., to make AI more sustainable from environmental, cost, and social perspective, is missing. For example, there has been research done about the green computing, and saving space, time and money by using cloud computing. Some research analyze the energy consumption of Cloud Computing by studying the clouds maintained by certain organizations and observing the energy benefits that they derive, and compare various data centers using Green Power Usage Effectiveness (GPUE). Power Usage Effectiveness (PUE) is the ratio of total amount of power used by a computer data center facility to the power delivered to computing equipment. GPUE includes energy source and has been established as a very good metric for measuring the greenness of data centers. But all of these are related to monitoring energy only and it does not address optimizing the selection of AI or ML based on environment sustainability.

Similarly, for Executable digital twin (xDT) platform which host multiple models consisting of simulation and digital twin, AI/ML assisted data-based models, mathematical models, hybrid models etc., it is important to consider the energy consumption. Important aspect of xDT is that models should run on real time or near real time compared to the actual system. While it may be done, it may also be important to make the models less hungry for its energy requirement.

In light of the above, it is therefore necessary to consider these aspects during the digitalization and to develop a systematic methodology to evaluate and rank AI/ML, xDT or the like algorithms for addressing specific tasks in the industrial setting in view of environmental considerations. There is a need of a viable solution to address issues related to the lack of framework or methodology to consider environmental aspects at the early stages of the design cycle during the development and implementation of Artificial Intelligence, Machine learning and Deep learning related techniques for any application.

SUMMARY

An aspect relates to a computer-implemented method for determining optimal computing configuration for executing a computing operation. The method comprises defining one or more constrains of a given computing operation to be executed. The method further comprises providing, by a processing unit, a knowledge graph, the knowledge graph generated, at least in part, by training of a machine learning model associated therewith based on energy consumption monitoring of a plurality of combinations of different computing hardware and different computing software implemented for executing a class of computing operations. The method further comprises implementing, by the processing unit, the knowledge graph to determine at least one suitable combination of computing hardware and computing software based on the given computing operation and the defined one or more constrains therefor. The method further comprises estimating, by the processing unit, at least one of an energy requirement and an energy consumption pattern of the determined at least one suitable combination of computing hardware and computing software for executing the given computing operation. The method further comprises performing, by the processing unit, a life cycle assessment for execution of the given computing operation utilizing the determined at least one suitable combination of computing hardware and computing software based on the estimation of at least one of the energy requirement and the energy consumption pattern, to determine an optimal combination of computing hardware and computing software therefor. The method further comprises outputting the determined optimal combination of computing hardware and computing software to an output device.

In an embodiment, the method further comprises quantitatively estimating, by the processing unit, the energy requirement of the determined at least one suitable combination of computing hardware and computing software for executing the given computing operation. The method further comprises qualitatively estimating, by the processing unit, the energy consumption pattern of the determined at least one suitable combination of computing hardware and computing software for executing the given computing operation.

In an embodiment, the machine learning model associated with the knowledge graph is further trained based on different computing parameters for executing the class of computing operations, for generating the knowledge graph. The method further comprises implementing, by the processing unit, the knowledge graph to determine at least one suitable computing parameter based on the given computing operation and the defined one or more constrains therefor. The method further comprises quantitatively estimating, by the processing unit, an energy requirement of the determined at least one suitable computing parameter for executing the given computing operation. The method also comprises qualitatively estimating, by the processing unit, an energy consumption pattern of the determined at least one suitable computing parameter for executing the given computing operation. The method further comprises performing, by the processing unit, the life cycle assessment for execution of the given computing operation based on the quantitative estimation of the energy requirement of the determined at least one suitable computing parameter and the qualitative estimation of the energy consumption pattern of the determined at least one suitable computing parameter, to determine optimal computing parameters for execution of the given computing operation.

In an embodiment, the at least one suitable computing parameter is further determined based on one or more of an implemented computing hardware and an implemented computing software for execution of the given computing operation. The method further comprises automatically configuring one or more of the implemented computing hardware and the implemented computing software for execution of the given computing operation based on the determined optimal computing parameters.

In an embodiment, the method further comprises outputting the determined optimal computing parameters for execution of the given computing operation to the output device.

In an embodiment, performing the life cycle assessment comprises performing one or more of an environmental life cycle assessment (E-LCA), a social life cycle assessment (S-LCA) and life cycle cost assessment (LCCA).

In an embodiment, the method further comprises reinforcing the knowledge graph by training of the machine learning model associated therewith based on correlation of the determined optimal combination of computing hardware and computing software, and the given computing operation.

In an embodiment, the method further comprises utilizing, by the processing unit, one or more multi-objective optimization techniques while implementing the knowledge graph to determine the at least one suitable combination of computing hardware and computing software based on the given computing operation and the defined one or more constrains therefor.

In an embodiment, the method further comprises analyzing, by the processing unit, available data about specifications of the different computing hardware, the different computing software and the different computing parameters in relation to the different computing operations, to generate the knowledge graph.

In an embodiment, the available data is in the form of technical documents. The method further comprises utilizing, by the processing unit, natural language processing to analyze information related to the specifications of different computing hardware, different computing software and different computing parameters in relation to different computing operations from the technical documents.

In an embodiment, the given computing operation is either one of computing operations from the class of computing operations, a derived computing operation from the class of computing operations or a different computing operation from the class of computing operations, used for generating the knowledge graph.

In an embodiment, the one or more constrains of the given computing operation to be executed comprises one or more of time, accuracy, space, sample, bias-variance tradeoff, online and offline capability, parallelizability and parametricity.

Another aspect relates to a system for determining optimal computing configuration for executing a computing operation. The system comprises at least one memory configured to store computer program code instructions. The system also comprises at least one processor configured to execute the computer program code instructions to cause the steps of the method described above.

An aspect further relates to a computer-program product, having machine-readable instructions stored therein, that when executed by a processor, cause the processor to perform steps of the method described above.

An aspect further relates to a computer readable medium on which program code sections of a computer program are saved, the program code sections being loadable into and/or executable in a system to make the system execute the method steps as described above when the program code sections are executed in the system.

Still other aspects, features, and advantages of embodiments of the invention are readily apparent from the following detailed description, simply by illustrating a number of particular embodiments and implementations, including the best mode contemplated for carrying out embodiments of the invention. Embodiments of the invention are also capable of other and different embodiments, and its several details may be modified in various obvious respects, all without departing from the scope of embodiments of the invention. Accordingly, the drawings and description are to be regarded as illustrative in nature, and not as restrictive.

BRIEF DESCRIPTION

Some of the embodiments will be described in detail, with reference to the following figures, wherein like designations denote like members, wherein.

DETAILED DESCRIPTION

Figure 1:
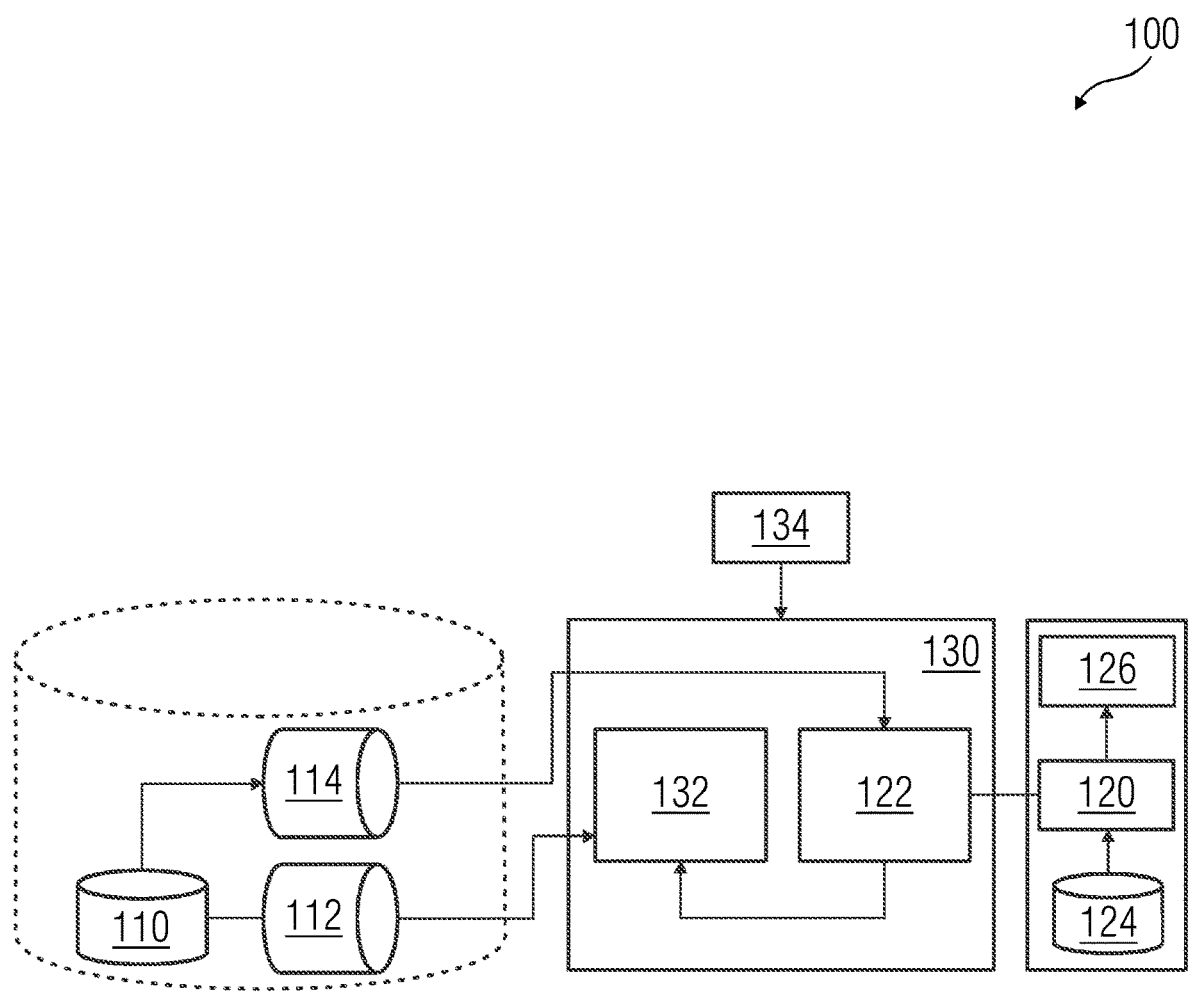
FIG. 1 is a schematic diagram of a high-level architecture of a computing configuration for executing an Artificial Intelligence (AI) based computing operation, in accordance with an embodiment of the present invention.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Examples of a method, a system, and a computer-program product for determining optimal computing configuration for executing a computing operation are disclosed herein. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a schematic representation of a high-level architecture of a computing configuration 100 for executing an Artificial Intelligence (AI) based computing operation (hereinafter, sometimes, referred to as "computing operation"), in accordance with one or more embodiments of the present invention. As illustrated, the computing operation involves data 110 which is used for training and generation of a model 120. Generally, the data 110 may be categorized from a perspective of the AI based computing operation into numerical data, categorical data, time-series data, and text. The data 110 is typically divided into a training dataset 112 and a testing dataset 114. The computing operation utilizes a computing hardware 130 and a computing software 132, as part of the computing configuration 100, for its execution. Further, the computing operation may involve defining one or more computing parameters 134 for the computing configuration 100, for its execution. In the computing operation, the training dataset 112 is fed to the computing software 132, being executed on the computing hardware 130. The computing software 132 may generate a temporary model which may be evaluated (as represented by a block 122) using the testing dataset 114, to generate the model 120. The model 120 may be fed production data 124 to generate predictions 126 thereby.

It may be appreciated that the described AI based computing operation is exemplary only, and other variations of the computing operation may be possible without any limitations. Herein, apart from a quality and a quantity of the utilized data 110, the variables which may affect the performance and efficiency of such computing operation include the computing hardware 130, the computing software 132 and the computing parameters 134. Further, it may be appreciated that the computing hardware 130, the computing software 132 and the computing parameters 134 work in conjunction (tandem) for affecting the performance and the efficiency of a given computing operation. Thus, in order to optimize the computing configuration 110 for the given computing operation, it may be required to determine an optimal combination of the computing hardware 130, the computing software 132 and the computing parameters 134 therefor.

Figure 2:
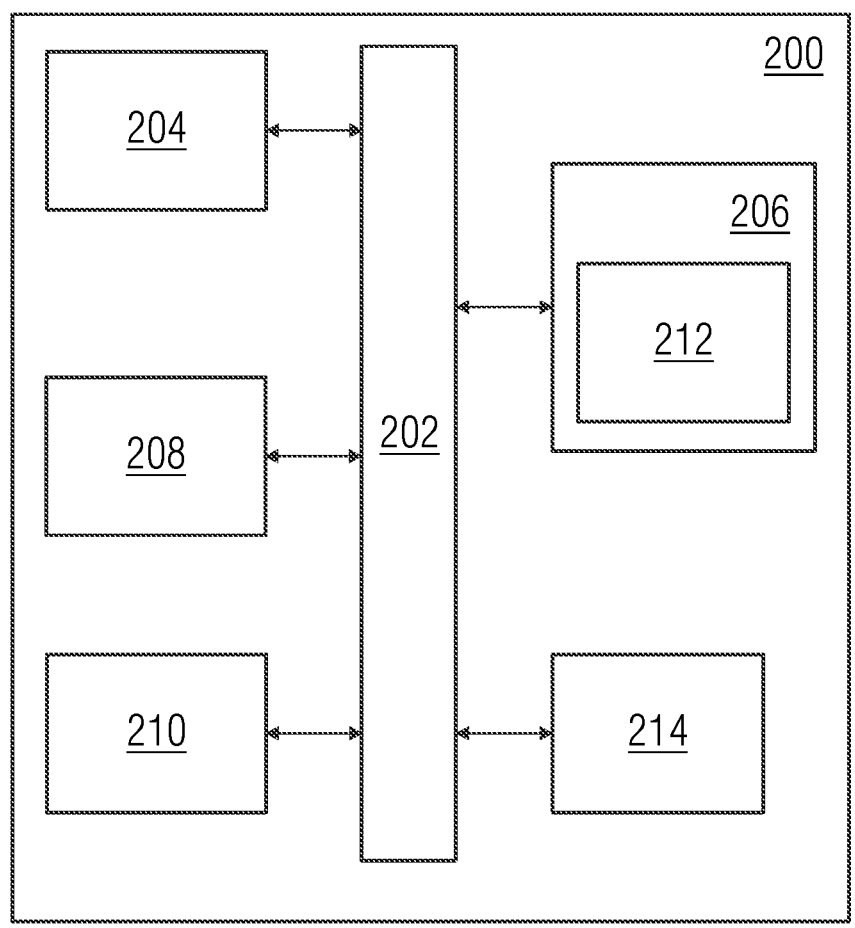
FIG. 2 is a schematic block diagram representation of a system for determining optimal computing configuration for executing a computing operation, in accordance with an embodiment of the present invention.

FIG. 2 illustrates a schematic diagram of a system 200 for determining optimal computing configuration for executing a computing operation, in accordance with an embodiment of the present invention. In an example, the system 200 may be embodied as a computer-program product 200 programmed for performing the said purpose. The system 200 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device may be implemented in a single chip. As illustrated, the system 200 includes a communication mechanism such as a bus 202 for passing information among the components of the system 200. The system 200 includes one or more processing units 204 and a memory unit 206. Generally, the memory unit 206 is communicatively coupled to the one or more processing units 204. Hereinafter, the one or more processing units 204 are simply referred to as processor 204 and the memory unit 206 is simply referred to as memory 206. In an example, the memory unit 206 (also, referred to as "memory 206") may be embodied as a computer readable medium on which program code sections of a computer program are saved, the program code sections being loadable into and/or executable in a system to make the system 200 execute the steps for performing the said purpose.

Herein, in particular, the processor 204 has connectivity to the bus 202 to execute instructions and process information stored in the memory 206. The processor 204 may include one or more processing cores with each core configured to perform independently. A multi-core processor enables multiprocessing within a single physical package. Examples of a multi-core processor include two, four, eight, or greater numbers of processing cores. Alternatively, or in addition, the processor 204 may include one or more microprocessors configured in tandem via the bus 202 to enable independent execution of instructions, pipelining, and multithreading. The processor 204 may also be accompanied with one or more specialized components to perform certain processing functions and tasks such as one or more digital signal processors (DSP) 208, or one or more application-specific integrated circuits (ASIC) 210. A DSP 208 typically is configured to process real-world signals (e.g., sound) in real time independently of the processor 204. Similarly, an ASIC 210 may be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

As used herein, the term "processor" refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system.

The processor 204 and accompanying components have connectivity to the memory 206 via the bus 202. The memory 206 includes both dynamic memory (e.g., RAM, magnetic disk, writable optical disk, etc.) and static memory (e.g., ROM, CD-ROM, etc.) for storing executable instructions that when executed perform the method steps described herein for determining optimal computing configuration for executing a computing operation. In particular, the memory 206 includes a module arrangement 212 to perform steps for determining optimal computing configuration for executing a computing operation. The memory 206 also stores the data associated with or generated by the execution of the inventive steps.

Herein, the memory 206 may be volatile memory and/or non-volatile memory. The memory 206 may be coupled for communication with the processing unit 204. The processing unit 204 may execute instructions and/or code stored in the memory 206. A variety of computer-readable storage media may be stored in and accessed from the memory 206. The memory 206 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

The system 200 further includes an output device 214. In an example, the output device 214 may be in the form of a display. It is to be understood that, when reference is made in embodiments of the present invention to the term "display" this refers generically either to a display screen on its own or to the screen and an associated housing, drive circuitry and possibly a physical supporting structure, of which all, or part of is provided for displaying information.

It is to be understood that the system 200 described herein may be implemented in various forms of hardware, software, firmware, special purpose processors, or a combination thereof. One or more of the present embodiments may take a form of a computer program product comprising program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

Figure 3:
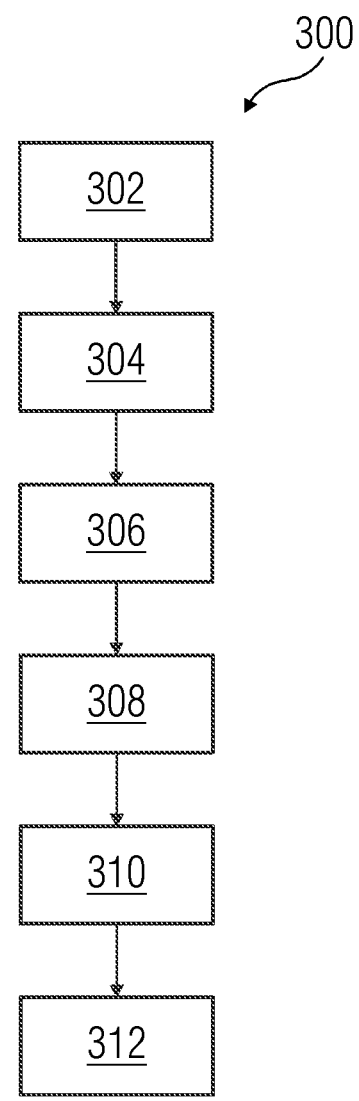
FIG. 3 is a flowchart illustrating a computer-implemented method for determining the optimal computing configuration for executing the computing operation, in accordance with an embodiment of the present invention.

FIG. 3 is a flowchart of a computer-implemented method 300 for determining the optimal computing configuration for executing the computing operation, in accordance with an embodiment of the present invention. Although the method 300 is illustrated and described as a sequence of steps, its contemplated that various embodiments of the method 300 may be performed in any order or a combination and need not include all of the illustrated steps. The various steps of the method 300 as described hereinafter may be executed in the system 200, or specifically in the processing unit 204 of the system 200, for determining optimal computing configuration for executing a computing operation. In embodiments of the present invention, the method 300 of FIG. 3 has been described in conjunction with FIG. 4 which is a schematic representation of a framework 400 for determining optimal computing configuration for executing the computing operation. Further, the method 300 has been described in conjunction with FIGS. 5-8 which provide details for different stages of execution of the framework 400 and details of components therein.

At step 302, the method 300 includes defining one or more constrains of a given computing operation to be executed. There are various factors which are considered for defining scope of a specific computing operation. Typically, the purpose of AI based computing operation is to discover patterns in data and then make predictions based on often complex patterns to answer questions, detect and analyze trends and help solve problems. Such computing operation is effectively a method of data analysis that works by automating the process of building data models. The AI based computing operation are applicable in various domains such as, problem solving, machine learning, game playing, decision making, image analysis, speech analysis, and the like. Each of these different application areas has different objectives and constrains associated to it. The optimal computing configuration, including the computing hardware, the computing software and the computing parameters, for a specific application depends on the constrains associated with the given computing operation.

In an embodiment, the one or more constrains of the given computing operation to be executed comprises one or more of time, accuracy, space, sample, bias-variance tradeoff, online and offline capability, parallelizability and parametricity. Herein, the time constraint may include consideration of training time, testing time and/or execution time of the computing operation. For some computing operations, the time may be limited and for others that may not be the case, and thus the time constraint of the computing operation may accordingly be defined. The accuracy constraint may include consideration of how accurate the predictions (such as, the predictions 126) need to be from the generated model (such as, the model 120). For some computing operations, the accuracy needs to be high and for others even lower accuracy may be sufficient, and thus the accuracy constraint of the computing operation may accordingly be defined. The space constraint may include consideration of how much memory and/or storage the implemented algorithm or the data (such as, the data 110) may need. The sample constraint may include measure of the number of training examples needed to train the model in order to ensure a valid generalization. The bias-variance tradeoff constraint may consider bias errors that come for the fact that a model is biased towards a specific solution or assumption. The online and offline capability constraint may consider the way the computing operation may learn how to update the model. The parallelizability constraint may consider if the algorithm may complete multiple operations at a given time. The parametricity constraint may consider if a number of parameters of the model is fixed or may grow when more data may be available. It may be appreciated that the given constrains are not exhaustive, and there may be other possible constrains which may affect performance and efficiency of the computing operations which shall be considered under the scope embodiments of the present invention.

Figure 4:
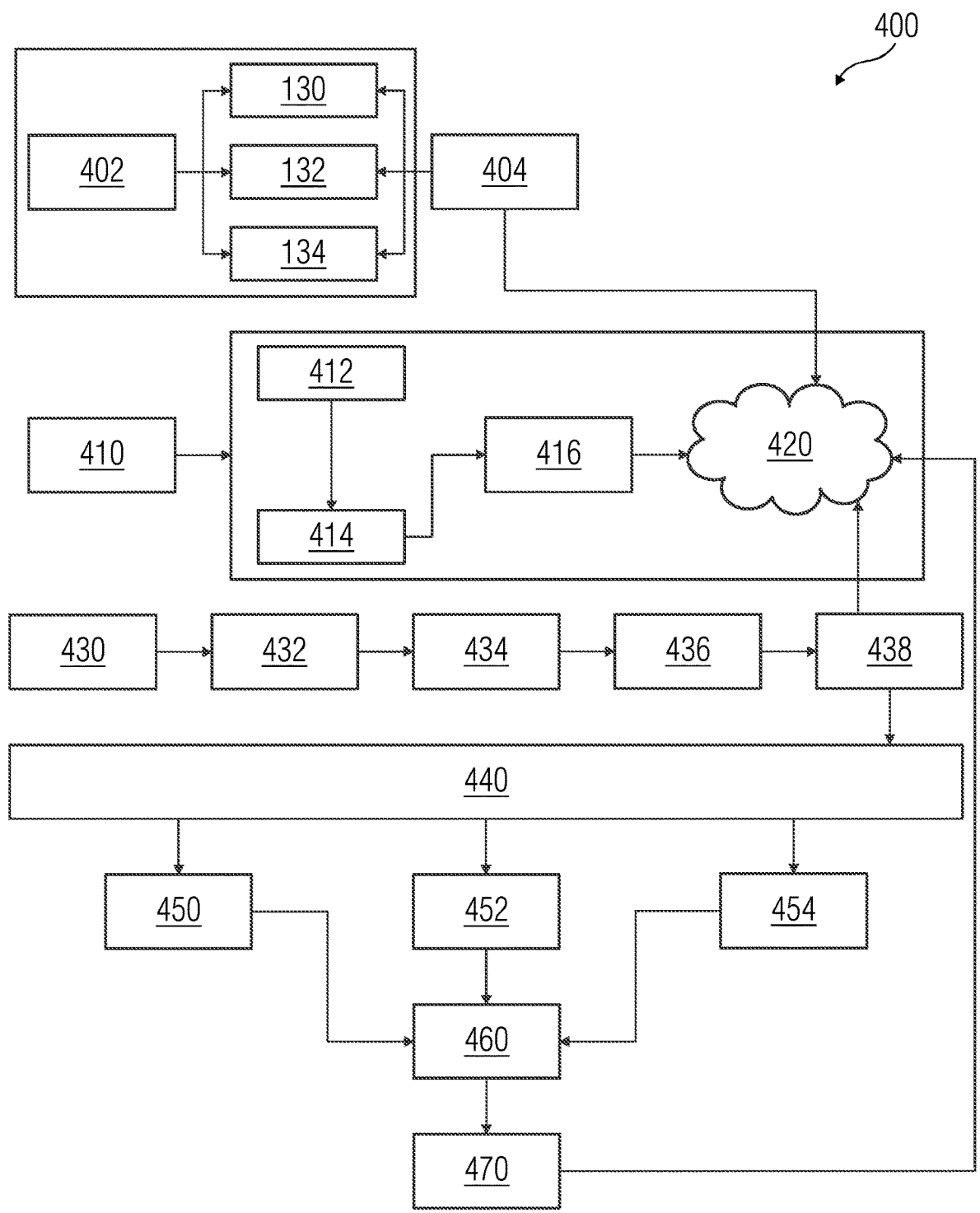
FIG. 4 is a schematic diagram of a framework for determining optimal computing configuration for executing a computing operation, in accordance with an embodiment of the present invention.

At step 304, the method 300 includes providing, by the processing unit 204, a knowledge graph 420 (as shown in FIG. 4). Herein, the use of term "providing" is meant to indicate that a knowledge graph is utilized as a reference to which relevant parameters may be compared for purposes of embodiments of the present invention. The knowledge graph 420 represents a collection of interlinked descriptions of entities, including real-world objects and events, or abstract concepts. In knowledge representation and reasoning, knowledge graph is a knowledge base that uses a graph-structured data model or topology to integrate data. Knowledge graphs are often used to store interlinked descriptions of entities with free-form semantics. The knowledge graph 420 may be in the form of a semantic network which represents a network of real-world entities, i.e., objects, events, situations, or concepts—and illustrates the relationship between them. For purposes of embodiments of the present invention, the knowledge graph 420 may provide semantic relationship between the different computing hardware 130, the different computing software 132 and the different computing parameters 134 as available in the art. For example, the details for the computing hardware 130 may include, but not limited to, CPU, RAM, GPU, processing speed, processor type, processing platform, and the like. Similarly, for example, the details for the computing software 132 may include, but not limited to, coding language, parallel computing capability, robustness, stability, CPU/GPU capable, and the like. Further, for example, the details for the computing parameters 134 may include, but not limited to, scalability, supported plugins, modules, unsupervised models, trained models, and the like.

Figure 5:
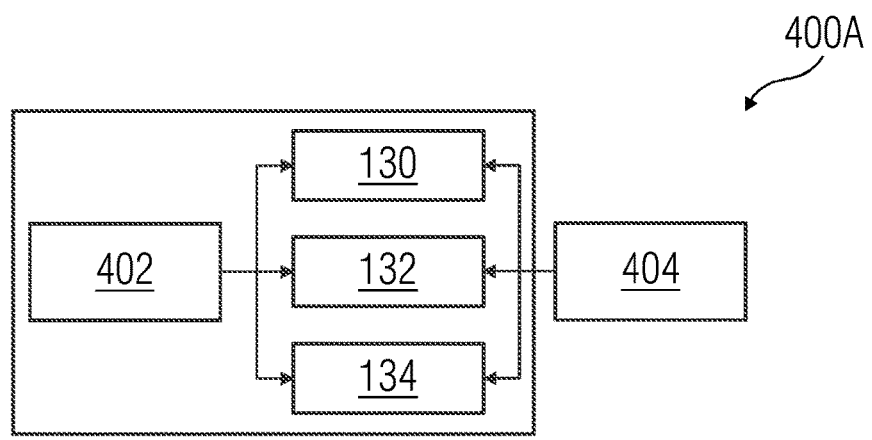
FIG. 5 is a schematic diagram of a first stage of the framework, in accordance with an embodiment of the present invention.

Referring to FIG. 5, in general, a first stage 400A (as illustrated) represents an energy consumption monitoring section of the framework 400. Since all the process carried out related to AI base computing operation eventually translates to the amount of energy being consumed thereby to train the model and during predictions, therefore energy consumption monitoring is a key aspect of for optimizing such computing operation, especially from the environmental considerations. As illustrated in FIG. 5, at block 402, the first stage 400A involves defining a class of computing operation for which the energy consumption monitoring is performed. Herein, the class of computing operation may include video/image based operations including face recognition, object detection, image generation, video analysis, video content audit, image beautify, search by image, etc.; sound and speech based operations including speech recognition, language synthesis, voice wake-up, voiceprint recognition, music generation, intelligent soundbox, intelligent navigation, etc.; natural language processing based operations including text analysis, language translation, human-machine communication, reading comprehension, recommendation system, etc.; control based operations including autopilot, robotics, industrial automation, etc.; and the like. Energy requirement and energy consumption pattern for each of these classes of computing operations may be different, and further may vary depending on the computing hardware 130, the computing software 132 and the computing parameters 134 implemented for executing a particular computing operation in a specific class of computing operations. At block 404, the first stage 400A involves energy consumption monitoring for each of the defined classes of computing operations for combinations of the different computing hardware 130, the different computing software 132 and the different computing parameters 134 utilized thereby.

As various types of the computing hardware 130, the computing software and the computing parameters 134 are being developed to run energy intensive AI training process for example, TPU's and faster interconnects. In embodiments of the present invention, the energy consumption is monitored during the development and operation of the AI algorithm to control the same. During development of the algorithm, it could be tested for different databases at different scales, and it is important to optimize certain tuning parameter values to decide environmentally friendly procedure to develop the AI algorithm. The first stage 400A of the framework 400 monitors the total energy consumed using available applications like Intel Power Gadget 3.5, Open Hardware Monitor, HWMonitor, Sidebar Diagnostics, Microsoft Visual Studio, Joulemeter developed by Microsoft etc. and GPU's in-built applications to monitor the energy consumption. Usage of this monitored energy is discussed in later in generation of the knowledge graph 420, as discussed later in the description.

Figure 6:
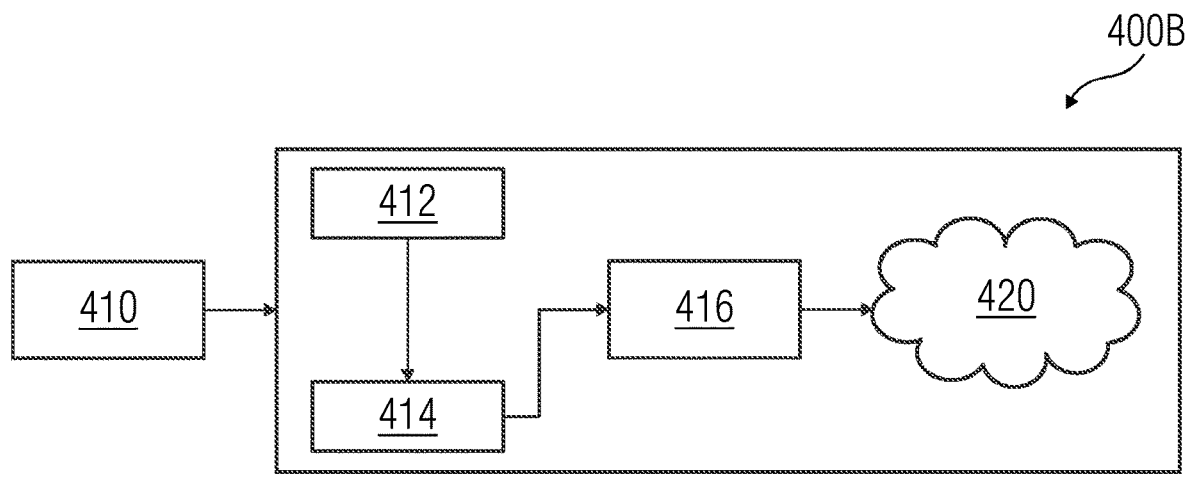
FIG. 6 is a schematic diagram of a second stage of the framework, in accordance with an embodiment of the present invention.

Referring to FIG. 6, in general, a second stage 400B (as illustrated) represents a knowledge graph generation stage of the framework 400. Herein, the knowledge graph 420 is generated, at least in part, by training of a machine learning model 416 associated therewith based on energy consumption monitoring of a plurality of combinations of different computing hardware 130 and different computing software 132 implemented for executing a class of computing operations. As discussed in the description of the first stage 400A, the specific energy requirement for the computing operations based on the computing hardware 130, the computing software 132 and the computing parameters 134 is monitored and such information is collected by the energy consumption monitoring block 404. In the second stage 400B, the collected information is stored in the form of the knowledge graph 420. In particular, in the second stage 400B, at block 410, the given computing operation to be executed is defined. Herein, the given computing operation is either one of computing operations from the class of computing operations 402, a derived computing operation from the class of computing operations 402 or a different computing operation from the class of computing operations 402, used for generating the knowledge graph 420.

In an embodiment, the method 300 further comprises analyzing, by the processing unit 204, available data (as represented by block 412) about specifications of the different computing hardware 130, the different computing software 132 and the different computing parameters 134 in relation to the different computing operations, to generate the knowledge graph 420. That is, the processing unit 204 may employ known information about the different computing hardware 130, the different computing software 132 and the different computing parameters 134 for training of the machine learning model 416, which in turn may feed such information to the knowledge graph 420 in an appropriate manner. In some embodiments, the available data 412 is in the form of technical documents, such as product brochures, product manuals and the like. In such case, the method 300 further comprises utilizing, by the processing unit 204, natural language processing (NLP), as performed by an NLP engine 414 to analyze information related to the specifications of the different computing hardware 130, the different computing software 132 and the different computing parameters 134 in relation to different computing operations from the technical documents. As discussed, the specifications for the computing hardware 130 may include, but not limited to, CPU, RAM, GPU, processing speed, processor type, processing platform, and the like; the specifications for the computing software 132 may include, but not limited to, coding language, parallel computing capability, robustness, stability, CPU/GPU capable, and the like; and the specifications for the computing parameters 134 may include, but not limited to, scalability, supported plugins, modules, unsupervised models, trained models, and the like.

At step 306, the method 300 includes implementing, by the processing unit 204, the knowledge graph 420 to determine at least one suitable combination of the computing hardware 130 and the computing software 132 based on the given computing operation and the defined one or more constrains therefor. Herein, the use of term "implementing" is meant to indicate that the generated knowledge graph 420 is utilized/executed to be referenced for further data processing for the purposes of embodiments of the present invention. The method 300 includes implementing, by the processing unit 204, the knowledge graph 430 to determine at least one suitable computing parameter 134 based on the given computing operation and the defined one or more constrains therefor. In general, as explained in the description of the second stage 400B, the idea is to use data from various sources to train the machine learning model 416 for the prediction of optimal combination of the computing hardware 130, the computing software 132 and the computing parameters 134 to reduce energy consumption specific to the class of computing operations. This combination may be derived directly from the knowledge graph 420. The capabilities of natural language processing engine 414 is used to go beyond the information in the knowledge graph 420 as available from the energy consumption monitoring block 404 and to use different sources to find out efficient hardware advancements, best practices, product manuals which are company specific or open source from the trusted partners. It may be understood that the at least one suitable combination of the computing hardware 130, the computing software 132 and the computing parameter 134 may include many possibilities outputted by the knowledge graph 420, and thus may need to be further verified by determining the best possible combination of the computing hardware 130, the computing software 132 and the computing parameter 134 for the given computing operation and the defined one or more constrains therefor.

At step 308, the method 300 further includes estimating, by the processing unit, at least one of an energy requirements and an energy consumption pattern of the determined at least one suitable combination of computing hardware and computing software for executing the given computing operation. Specifically, in an embodiment, the method 300 includes quantitatively estimating, by the processing unit 204, the energy requirement of the determined at least one suitable combination of computing hardware 130 and computing software 132 for executing the given computing operation. Further, in an embodiment, the method 300 further includes qualitatively estimating, by the processing unit 204, the energy consumption pattern of the determined at least one suitable combination of computing hardware 130 and computing software 132 for executing the given computing operation. In the present embodiments, the method 300 further includes quantitatively estimating, by the processing unit 204, an energy requirement of the determined at least one suitable computing parameter 134 for executing the given computing operation, and qualitatively estimating, by the processing unit 204, an energy consumption pattern of the determined at least one suitable computing parameter 134 for executing the given computing operation. In an additional embodiment, the at least one suitable computing parameter 134 is further determined based on one or more of the implemented computing hardware 130 and the implemented computing software 132 for execution of the given computing operation.

Figure 7:
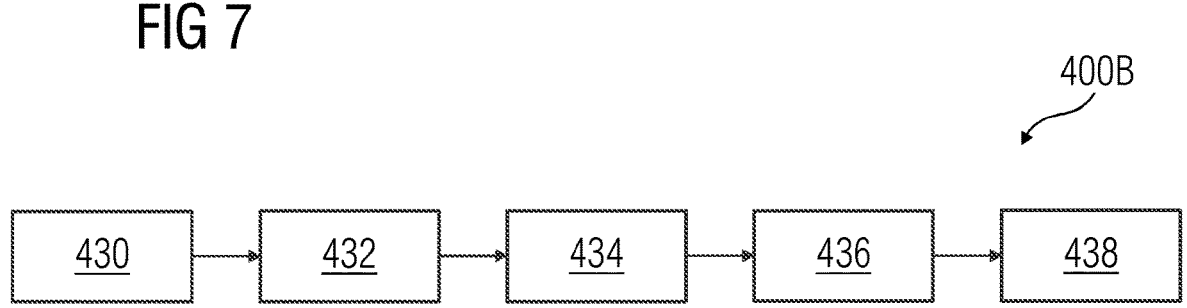
FIG. 7 is a schematic diagram of a third stage of the framework, in accordance with an embodiment of the present invention.

FIG. 7 is a schematic diagram of a third stage 400C of the framework 400 which performs such estimation steps. As shown in FIG. 7, at block 430, first the at least one suitable combination of computing hardware 130 and computing software 132 are received from the knowledge graph 420, as determined thereby. At block 432, different options to meet the different constrains for the computing operations are defined. As may be understood, there are many parameters like accuracy, time, RAM, processors, graphics, parallelization techniques, etc. to be considered. Based on all these parameters, there could be multiple options available to reduce the energy consumption.

In an embodiment, the method 300 includes utilizing, by the processing unit 204, one or more multi-objective optimization techniques while implementing the knowledge graph 420 to determine the at least one suitable combination of computing hardware 130 and computing software 132, as well as the computing parameters 134, based on the given computing operation and the defined one or more constrains therefor. Herein, the multi-objective optimization is an area of multiple criteria decision making that is concerned with mathematical optimization problems involving more than one objective function to be optimized simultaneously. For this purpose, at block 434, the multi-objective optimization technique is employed to respect different constrains of the given computing operation, including and specifically environmental aspects which generally tends towards minimizing energy consumption while minimizing time, maximizing accuracy of the model (such as the model 120). In the present examples, the one or more multi-objective optimization techniques may include, but not limited to, multi-objective genetic algorithm (MOGA), response surface methodology (RSN), particle swarm optimization (PSO), etc.

At block 436, the obtained most suitable combination of the computing hardware 130, the computing software 132 and the computing parameters 134 may be quantitatively checked for its energy requirement based on the known information about independent energy requirement aspects of the computing hardware 130, the computing software 132 and the computing parameters 134 therein. Further, the obtained most suitable combination of the computing hardware 130, the computing software 132 and the computing parameters 134 may be qualitatively checked for its energy consumption pattern based on the known information about independent energy consumption pattern aspects of the computing hardware 130, the computing software 132 and the computing parameters 134 therein. Based on such estimations, at block 438, the most suitable combination of the computing hardware 130 and the computing software 132 and the computing parameters 134 is derived which could increase the overall performance of the model 120 and with minimal energy requirement.

At step 310, the method 300 includes performing, by the processing unit 204, a life cycle assessment (as represented by block 440) for execution of the given computing operation utilizing the determined at least one suitable combination of computing hardware 130 and computing software 132 based on the estimation of at least one of the energy requirements and the energy consumption pattern, to determine an optimal combination of computing hardware 130 and computing software 132 therefor. Herein, the method 300 further includes performing, by the processing unit 204, the life cycle assessment for execution of the given computing operation based on the quantitative estimation of the energy requirement of the determined at least one suitable computing parameter 134 and the qualitative estimation of the energy consumption pattern of the determined at least one suitable computing parameter 134, to determine optimal computing parameters 134 for execution of the given computing operation. Herein, the life cycle assessment (LCA) 440, also known as life cycle analysis, is a methodology for assessing environmental impacts associated with all the stages of the life cycle of a commercial product, process, or service. In general, the LCA 440 is a method of quantifying the environmental impacts associated with a given product. In the LCA 440, an inventory of resources used is created and from this an impact assessment estimates the product's ultimate effects on ecosystem function, natural resource depletion, human health, and the like. In the present embodiments, the LCA 440 is performed using available tools like Simapro, GaBi, OpenLCA, etc. to estimate the environmental impacts. For the purposes of embodiments of the present invention, mainly global warming potential, Ozone depletion, fossil depletion, air acidification, etc. are the parameters that may be selected based on the area of interest. Global warming potential values, for example, again depends on the different LCA input parameters like energy source, database, geographical location, time of operation etc. Therefore, another level of optimization is performed to arrive at the optimal energy sources, in the embodiments of the present invention.

In embodiments of the present invention, the LCA 440 may generally include defining the goal and scope for optimization of the computing hardware 130, the computing software 132 and the computing parameter 134; performing the inventory analysis based on the available computing hardware 130, computing software 132 and computing parameters 134; impact assessment which may be derived from the estimation(s) performed (as described above); and interpretation which provides optimal options to the user to take necessary actions, e.g., to perform the training at a suitable place at suitable time of the day or month or year based on the level of automation in the pipeline. The results of the LCA 440 are directly connected to the present method 300 and it guides decision making during AI development or implementation.

Figure 8:
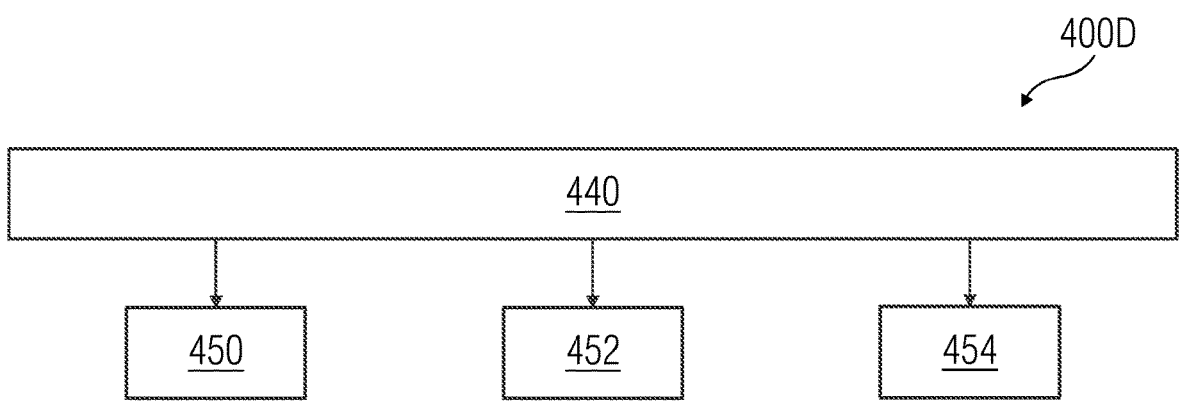
FIG. 8 is a schematic diagram of a fourth stage of the framework, in accordance with an embodiment of the present invention.

FIG. 8 is a schematic diagram of a fourth stage 400D of the framework 400. In an embodiment, as illustrated with reference to the fourth stage 400D, performing the life cycle assessment 440 comprises performing one or more of an environmental life cycle assessment (E-LCA) (as represented by block 450), a social life cycle assessment (S-LCA) (as represented by block 452) and life cycle cost assessment (LCCA) (as represented by block 454). As the fundamental idea is to develop sustainable framework, it may be important to consider environmental, economic, and social impacts of the determined most suitable computing configuration for executing the computing operation. Effect of these parameters are studied using life cycle analysis techniques and optimized configuration is determined based on the application specific requirements. It may be appreciated that same techniques as multi objective optimization may be used here for the finalization of tuning parameters. As these parameters are varying and demand is not always constant, the optimization and finding suitable option needs to be application specific and dynamic in nature.

Herein, one of the important aspects in such analysis is the environmental life cycle assessment (E-LCA) 450. For example, assuming there will not be shortage of electricity during rainy season of the year at specific locations because of the hydropower. In an example, hydro power may be environmentally friendly compared to fossil power generation and for this reason, training may be performed at that specific timeframe and location. In another example, if the application is small, solar power may be used and hence it may be very efficient to run such training mostly during the daytime. In another example, if the computation capabilities may be setup at the place where renewable energy source is more abundant than the non-renewable, then such option is presented to the user for better environmental performance. It may be appreciated that although environmental performance may be of interest to the user, other factors including cost also plays in an important role in the decision making for determining optimal computing configuration for executing the given computing operation.

For instance, one of the other important aspects in such analysis is the economics (cost) and hence life cycle cost assessment (LCCA) 452 is also performed in parallel to associate cost related parameters in the focus. Life cycle cost assessment (LCCA) 452 is an economic approach that sums up total costs of a product, process or activity discounted over its lifetime. Most of the LCCA tools also supports LCA 440 and the required results may be obtained using the same. Study includes cost of the computing hardware 130 at different location, cost of development of the computing software 132, cost of energy, cost of maintenance, transportation cost, cost of setting up computational facility, etc.

Another important aspect of the life cycle analysis is Social Life Cycle Assessment (S-LCA) 454. S-LCA 454 is a social impact assessment methodology that focuses on life cycle activities that affect people and society. S-LCA 454 may be quantitative, semi-quantitative or qualitative, and complements E-LCA and LCCA. In the aspect of sustainable AI model, S-LCA 454 is important to consider for working conditions when there is human interaction, implementation practices of AI, human rights violations etc. For example, location of the computational facility may be near the housing layouts and generators making noise during power cut might be disturbing to locality, and thus the facility could be moved; controlled temperature inside the computational facility may not be appropriate for human to work there, and thus the temperature control may accordingly be adjusted if possible. This may further be extended to points like how it impacts the cultural aspects of the society by implementing AI in specific application etc.

As illustrated in FIG. 4, the LCA 440 leads to the determination of the optimal parameters with environmental considerations (as represented by block 460). The determined optimal parameters provide the optimal computing configuration for executing the given computing operation. In the present embodiments, at block 470, the determined optimal parameters are further monitored for energy consumption and may further be optimized if required. In an embodiment, the method 300 further comprises reinforcing the knowledge graph 420 by training of the machine learning model 416 associated therewith based on correlation of the determined optimal combination of computing hardware 130 and computing software 132 as well as the computing parameters 134, and the given computing operation. That is, as shown in FIG. 4, learning from the LCA 440 may be stored again in the knowledge graph 420. Herein, the learning may include data related to the optimal parameters with environmental considerations for the different computing hardware 130, the different computing software 132 and the different computing parameters 134 in relation to the different computing operations as determined by the LCA 440, which may be used to expand the knowledge graph 420. In general, based on the LCA 440, optimal parameters are decided like the computing hardware 130, the computing software 132 and the computing parameter 134, keeping accuracy, timeframe to train AI model, environmental aspects, cost aspects and social aspects in consideration. This is implemented and outcome is monitored, and the learnings are updated in the form of knowledge graph 420 and reinforcement learning techniques are used in this regard. In embodiments of the present invention, the framework 400 is flexible to tune based on the specific computing application.

At step 312, the method 300 includes outputting the determined optimal combination of computing hardware 130 and computing software 132 to the output device 214. In an embodiment, the method 300 further comprises outputting the determined optimal computing parameters 134 for execution of the given computing operation to the output device 214. As discussed, the at least one suitable computing parameter 134 is further determined based on one or more of the implemented computing hardware 130 and the implemented computing software 132 for execution of the given computing operation. Herein, the method 300 further comprises automatically configuring one or more of the implemented computing hardware 130 and the implemented computing software 132 for execution of the given computing operation based on the determined optimal computing parameters 134. Such automatic implementation of the computing parameters 134 may be contemplated by a person skilled in the art and thus not discussed herein for the brevity of embodiments of the present invention.

Embodiments of the present invention may further be implemented for developing a sustainable executable digital twin platform/framework. As may be understood, an executable digital twin (xDT) platform may host multiple models consisting of simulation and digital twin, AI/ML assisted data-based models, mathematical models, hybrid models etc. Important aspect of xDT is that models should run on real time or near real time compared to the actual system. While it may be done, it is also important to make the models less hungry for energy. In embodiments of the present disclosure, specific parameters based on the type of the model is selected for optimization. For instance, in AI/ML models, quantity of data for trainings, number of epochs, number of neuron layers, hardware software combination to run training and inferencing, geographical location of the servers, source of the energy, time in a day to run the model etc. are the parameters which is optimized for reduced energy consumption. Herein, the problem is framed as multi objective optimization problem and optimized parameter values are found for reduced energy consumption (as described in the preceding paragraphs). In simulation/DT models, the baseline is defined and optimized for the fidelity of models, with respect to 1D/MOR/2D/3D; discretization schemes, hardware software combination, convergence criteria, etc., to represent the performance metric with least energy footprint, while also devising a strategy for compute fingerprint for least overall environmental footprint. In data copies/servers, the baseline is defined and optimized for minimizing the redundancy of data models in the system, leading to a favorable energy savings outcomes. The above described three artifacts make the independent models inside the executable digital twin platform greener and thus the overall xDT framework becomes sustainable and green.

One of the recent advancements in technology which is solving complex and human intensive problem is Artificial Intelligence. Adding intelligence to machines or systems artificially to perform tasks equivalent to humans or better than humans is a tremendous success. This advancement is opening doors for the Industry 4.0 as well. While it is having multiple positive impacts, it is very essential to analyze and address its adverse impacts as well or limiting features. One of the important limiting factors, which is not fully addressed by the research and customer community is the impact of AI on the environment. Artificial intelligence, machine learning, deep learning, reinforcement learning, executable digital twins (xDT) demands for the energy intensive training activities to perform better during any application. This results in significant carbon emissions, if one considers the process from cradle to grave lifecycle.

World is looking for the sustainable development of product and technology. It is reflected in the United Nation's sustainability development goals, and many nations and organizations are taking many actions to reduce the carbon footprint in all possible ways. Practicing sustainable principles not only have good impact on the environment but also streamlines the process of product or technology development thus increasing the scalability and adaptability of the product or technology for different applications. This open up market for various technologies horizontally. Available solutions in this regards are mainly concentrating on the optimization of individual components like hardware or software in general.

Embodiments of the present invention provide radical new way of looking at AI to make it better and suitable for next generation industrial problems. There are many rules and regulations for product development and it's emission but there are no such norms as of now for AI. These are expected to happen in near future, i.e., emission related rules for AI and it would be late to shift the focus at later stage. Therefore, the proposed framework is beneficial for any business unit in general as AI has its application in multiple fields. The proposed framework promotes ecofriendly technology development. In the present implementations, Lean Six Sigma approach such as DMAIC—Define, Measure, Analyze, Improve and Control is used during the complete development of the framework 400 to understand the problem in detail, identify the gaps and to improve the process.

Embodiments of the present invention provides a novel framework or methodology to consider sustainability not only during the down-selection of AI algorithms, but also while devising new algorithms for the overall goal of minimizing impact on the environment. In embodiments of the present invention, operation aspects of the existing models are also considered, and necessary actions are proposed to make the complete process of training and operating more ecofriendly. Embodiments of the present invention provide a holistic approach and framework which enables AI processes, including executable digital twins, data servers, to become sustainable and environmentally friendly. Embodiments of the present invention makes use of AI technology to make itself a better candidate for solving complex industrial problems. Embodiments of the present invention promotes environmental consideration at the early stages of the life cycle of AI process. Currently there are no tools and methodology available readily to compare, down select, develop, and implement sustainable ecofriendly AI, but embodiments of the present invention address such issues. In embodiments of the present invention, LCA techniques along with knowledge graphs and NLP are being used for product development and to ensure that past best practices in AI and their tuning parameters are encapsulated and used to solve the problem of determining optimal computing configuration for executing a computing operation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for determining optimal computing configuration for executing a computing operation, the method comprising:
    defining one or more constrains of a given computing operation to be executed;
    providing, by a processing unit, a knowledge graph, the knowledge graph generated, at least in part, by training of a machine learning model associated therewith based on energy consumption monitoring of a plurality of combinations of different computing hardware and different computing software implemented for executing a class of computing operations;
    implementing, by the processing unit, the knowledge graph to determine at least one suitable combination of computing hardware and computing software based on the given computing operation and the defined one or more constrains therefor;
    estimating, by the processing unit, at least one of an energy requirement and an energy consumption pattern of the determined at least one suitable combination of computing hardware and computing software for executing the given computing operation;
    performing, by the processing unit, a life cycle assessment for execution of the given computing operation utilizing the determined at least one suitable combination of computing hardware and computing software based on the estimation of at least one of the energy requirement and the energy consumption pattern, to determine an optimal combination of computing hardware and computing software therefor; and
    outputting the determined optimal combination of computing hardware and computing software to an output device.

2. The method according to claim 1 further comprising:
    quantitatively estimating, by the processing unit, the energy requirement of the determined at least one suitable combination of computing hardware and computing software for executing the given computing operation; and
    qualitatively estimating, by the processing unit, the energy consumption pattern of the determined at least one suitable combination of computing hardware and computing software for executing the given computing operation.

3. The method according to claim 1, wherein the machine learning model associated with the knowledge graph is further trained based on different computing parameters for executing the class of computing operations, for generating the knowledge graph, and wherein the method further comprises:
    implementing, by the processing unit, the knowledge graph to determine at least one suitable computing parameter based on the given computing operation and the defined one or more constrains therefor;
    quantitatively estimating, by the processing unit, an energy requirement of the determined at least one suitable computing parameter for executing the given computing operation;
    qualitatively estimating, by the processing unit, an energy consumption pattern of the determined at least one suitable computing parameter for executing the given computing operation;
    performing, by the processing unit, the life cycle assessment for execution of the given computing operation based on the quantitative estimation of the energy requirement of the determined at least one suitable computing parameter and the qualitative estimation of the energy consumption pattern of the determined at least one suitable computing parameter, to determine optimal computing parameters for execution of the given computing operation.

4. The method according to claim 3, wherein the at least one suitable computing parameter is further determined based on one or more of an implemented computing hardware and an implemented computing software for execution of the given computing operation, and wherein the method further comprises automatically configuring one or more of the implemented computing hardware and the implemented computing software for execution of the given computing operation based on the determined optimal computing parameters.

5. The method according to claim 3 further comprising outputting the determined optimal computing parameters for execution of the given computing operation to the output device.

6. The method according to claim 1, wherein performing the life cycle assessment comprises performing one or more of an environmental life cycle assessment, a social life cycle assessment and life cycle cost assessment.

7. The method according to claim 1 further comprising reinforcing the knowledge graph by training of the machine learning model associated therewith based on correlation of the determined optimal combination of computing hardware and computing software, and the given computing operation.

8. The method according to claim 1 further comprising utilizing, by the processing unit, one or more multi-objective optimization techniques while implementing the knowledge graph to determine the at least one suitable combination of computing hardware and computing software based on the given computing operation and the defined one or more constrains therefor.

9. The method according to claim 1 further comprising analyzing, by the processing unit, available data about specifications of the different computing hardware, the different computing software and the different computing parameters in relation to the different computing operations, to generate the knowledge graph.

10. The method according to claim 9, wherein the available data is in the form of technical documents, and wherein the method further comprises utilizing, by the processing unit, natural language processing to analyze information related to the specifications of different computing hardware, different computing software and different computing parameters in relation to different computing operations from the technical documents.

11. The method according to claim 1, wherein the given computing operation is either one of computing operations from the class of computing operations, a derived computing operation from the class of computing operations or a different computing operation from the class of computing operations, used for generating the knowledge graph.

12. The method according to claim 1, wherein the one or more constrains of the given computing operation to be executed comprises one or more of time, accuracy, space, sample, bias-variance tradeoff, online and offline capability, parallelizability and parametricity.

13. A system for determining optimal computing configuration for executing a computing operation, the system comprising:
one or more processing units; and
a memory unit communicatively coupled to the one or more processing unit, wherein the memory unit comprises a configuration module stored in the form of machine-readable instructions executable by the one or more processing units, wherein the configuration module is configured to perform method steps according claim 1.

14. A computer-program product having machine-readable instructions stored therein, which when executed by one or more processing units, cause the processing units to perform the method according to claim 1.

15. A computer readable medium on which program code sections of a computer program are saved, the program code sections being loadable into and/or executable in a system to make the system execute the method steps according to claim 1 when the program code sections are executed in the system.

* * * * *